United States Patent [19]

Venable et al.

[11] Patent Number: 4,774,849
[45] Date of Patent: Oct. 4, 1988

[54] GEAR MECHANISM WITH WEAR COMPENSATION

[75] Inventors: E. David Venable; David C. Shropshire; G. David Fetters, all of Lafayette, Ind.

[73] Assignee: TRW Inc., Lyndhurst, Ohio

[21] Appl. No.: 869,361

[22] Filed: Jun. 2, 1986

[51] Int. Cl.⁴ .............................................. F16H 1/16
[52] U.S. Cl. ........................................ 74/425; 74/409; 74/411; 74/500; 384/215
[58] Field of Search ................. 74/425, 409, 500, 411; 384/215, 217

[56] References Cited

U.S. PATENT DOCUMENTS

| | | | |
|---|---|---|---|
| 1,175,805 | 3/1916 | Pembroke | 74/500 |
| 1,276,237 | 8/1918 | Lovejoy | 74/500 |
| 1,512,424 | 10/1924 | Jones . | |
| 1,869,576 | 8/1932 | Nyland . | |
| 1,899,270 | 2/1933 | Hammond . | |
| 2,067,969 | 1/1937 | Kull et al. | 74/500 X |
| 3,090,258 | 5/1963 | Zink et al. | 74/411 X |
| 3,297,240 | 1/1967 | Tatsutomi | 74/411 X |
| 3,433,501 | 3/1969 | Hertel | 74/500 X |
| 4,612,822 | 9/1986 | Nishikawa et al. | 74/409 X |

FOREIGN PATENT DOCUMENTS 1012614 12/1965 United Kingdom ................ 74/409

Primary Examiner—Kenneth J. Dorner
Assistant Examiner—James R. Brittain
Attorney, Agent, or Firm—Tarolli, Sundheim & Covell

[57] ABSTRACT

A steering gear mechanism includes a housing and a worm gear having an input portion. The worm gear is supported for rotation in the housing. A sector gear has teeth in meshing engagement with teeth formed on the worm gear. The sector gear has an output portion. A circumferentially expandable spring pin supports the sector gear for pivotal movement relative to the housing and biases the sector gear into meshing engagement with the worm gear to compensate for wear of the gears. The housing has means for supporting the spring pin.

5 Claims, 2 Drawing Sheets

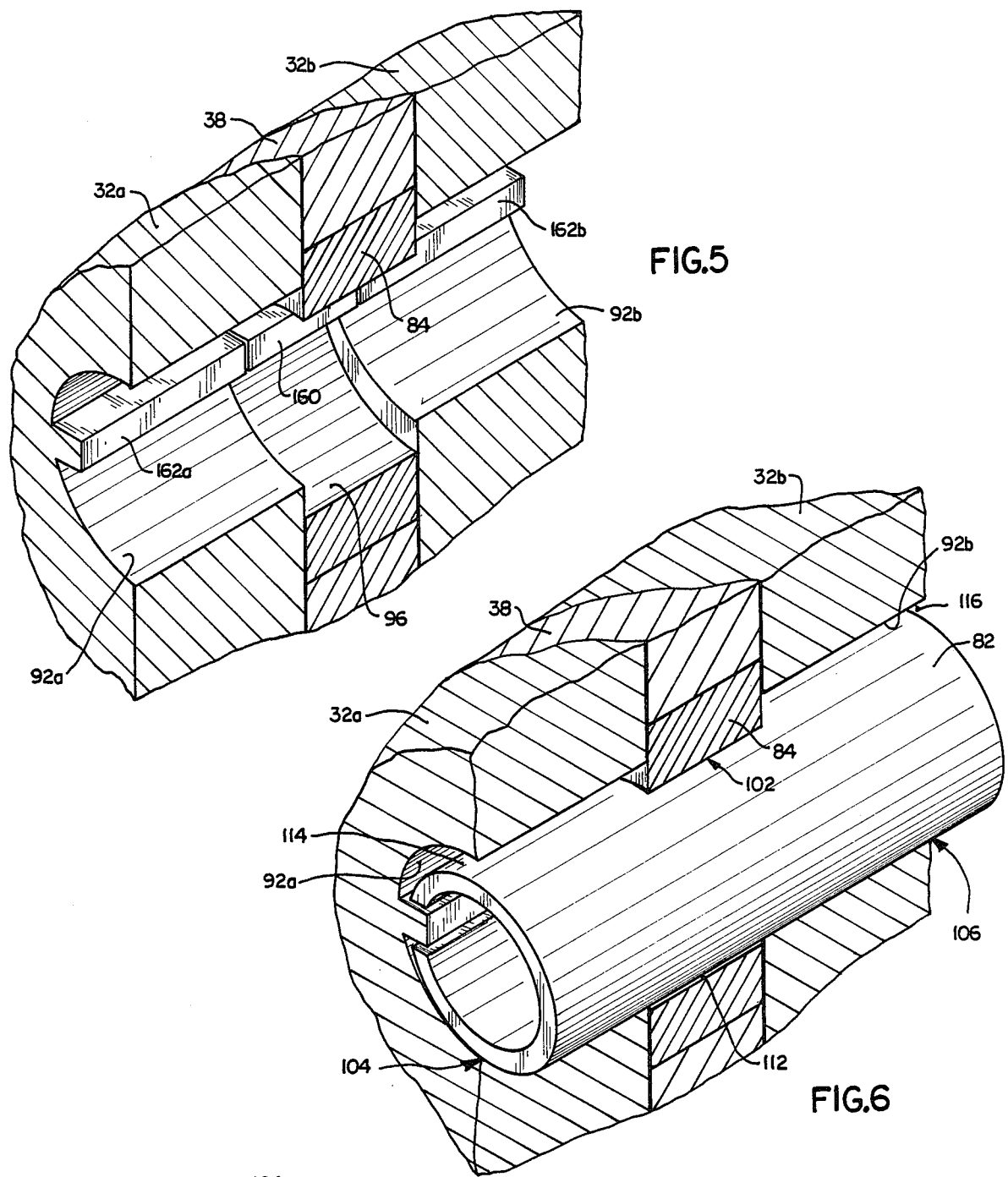
FIG.5
FIG.6
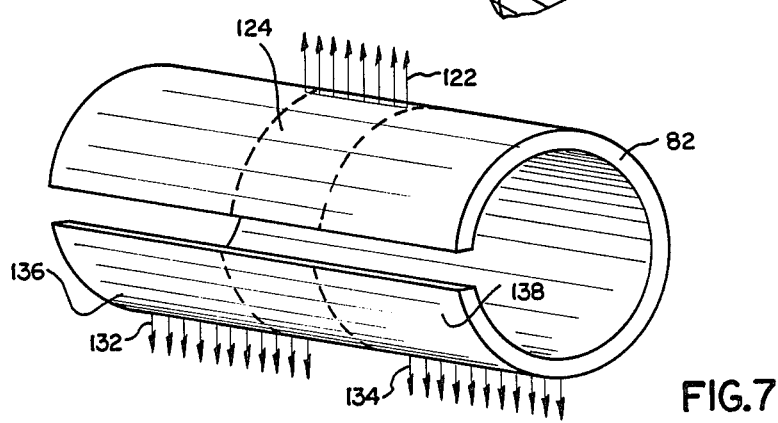
FIG.7

GEAR MECHANISM WITH WEAR COMPENSATION

BACKGROUND OF THE INVENTION

The present invention relates to a gear mechanism, and specifically, relates to a steering gear mechanism which has structure for compensating for wear of meshing gear teeth.

Meshing gear teeth are subject to wear. To maintain tight meshing engagement between gears, gear mechanisms have been provided with wear compensating structures. For example, U.S. Pat. No. 1,869,576 discloses a wear compensating structure for a steering gear. The steering gear in U.S. Pat. No. 1,869,576 includes a worm gear and a sector gear in meshing engagement. The sector gear is biased into meshing engagement with the worm gear by a spring. Clearance is provided between the shaft supporting the sector gear and bearings to enable the shaft supporting the sector gear to move due to the spring bias. The spring automatically maintains the gear teeth in tight meshing engagement even though the gear teeth wear. The spring is a coil spring and functions only for wear compensation.

Known steering mechanisms have also included structure for manual adjustment of the gears to compensate for gear tooth wear. Because of the additional parts required to accomplish the wear compensation, these mechanisms are relatively complex and difficult to assemble.

SUMMARY OF THE INVENTION

The present invention is a gear mechanism which has structure for compensating for wear of meshing gear teeth. The structure for compensating for gear tooth wear is a spring which urges one gear into meshing engagement with another gear and which also functions as the shaft for one of the gears. A gear mechanism constructed in accordance with the present invention has few parts, and is easy to assemble.

The gear mechanism of the present invention includes a pair of gears in meshing engagement. One of the gears is supported for rotation relative to a housing by a combined gear support and wear compensation structure which merely comprises a spring pin and bushing. The spring pin is of a general cylindrical configuration and is circumferentially expandable. The spring pin is assembled with the housing and the one gear so that it is initially circumferentially compressed. As the gear teeth wear, the spring pin expands circumferentially to maintain the meshing engagement between the gear teeth.

BRIEF DESCRIPTION OF THE DRAWINGS

The foregoing and other features and advantages of the present invention will be apparent to those skilled in the art to which the invention relates upon a reading of the following specification made in conjunction with the accompanying drawings, wherein:

FIGS. 5 an 6 are enlarged perspective views illustrating the relationship of parts of the present invention; and FIG. 7 is an enlarged perspective view of a part in the gear mechanism of FIG. 1 and illustrating the forces transmitted by the part.

DESCRIPTION OF A PREFERRED EMBODIMENT

Figure 1:
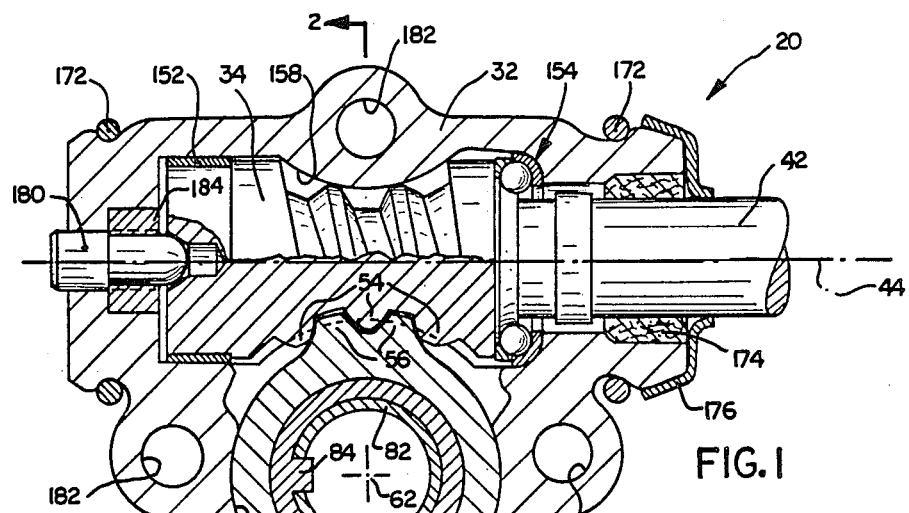
FIG. 1 is a cross sectional view, illustrating a gear mechanism embodying the present invention.

The present invention relates to a gear mechanism having a pair of gears with teeth in meshing engagement. The invention may be embodied in different gear mechanisms and is illustrated in FIG. 1 as embodied in a steering gear mechanism 20. The steering gear mechanism 20 includes a housing 32, a first or drive gear 34 and a second or driven gear 38. A gear support and wear compensation assembly 36 performs the dual functions of pivotally supporting the second gear 38 and automatically compensating for wear of the meshing teeth of the gears 34 and 38.

The first gear 34 is an hourglass shaped worm gear and is connected with an input shaft 42. The input shaft 42 rotates in response to turning the steering wheel of the vehicle in which the steering gear mechanism 20 is located. The first gear 34 and the input shaft 42 are supported by the housing 32 for rotational movement about a central axis 44. The first gear 34 has gear teeth 54 in meshing engagement with gear teeth 56 of the second gear 38.

The second gear 38 is a sector gear supported for pivoting about an axis 62. The gear support and wear compensation assembly 36 is supported by the housing 32 and in turn supports the second gear 38 for pivotal movement about the axis 62. An output portion 72 of the second gear extends from an opening in the housing 32.

Rotation of the input shaft 42 in one direction causes the teeth 54 on the first gear 34 to transmit forces to the teeth 56 of the second gear 38. These forces cause the second gear 38 to pivot about the axis 62. The output portion 72 pivots with the second gear 38 relative to the housing 32. The output portion 72 is connected with a suitable mechanism in the vehicle to effect turning of the steerable vehicle wheels on movement thereof. When the input shaft 42 is rotated counterclockwise, as viewed in FIG. 2, the output portion 72 pivots to the right as viewed in FIG. 1 to move the vehicle's wheels in one direction. When the input shaft 42 is rotated clockwise as viewed in FIG. 2, the output portion 72 pivots to the left as viewed in FIG. 1 to move the vehicle's wheels in an opposite direction.

The housing 32 has two halves 32a, 32b made of a light castable material. Each half 32a, 32b has a respective bore 92a, 92b therein. The bores 92a, 92b are coaxial. The gear support and wear compensation assembly 36 includes a cylindrical spring pin 82 and a bushing 84. The cylindrical spring pin 82 is formed from a resilient material, such as spring steel, and is circumferentially expandable. The opposite ends of the spring pin 82 project into the bores 92a, 92b of the housing 32.

The bushing 84 has a bore 96 through which the spring pin 82 extends and is located in a bore in the sector gear 38. The bushing 84 permits the sector gear 38 to pivot relative to the spring pin 82. The bushing 84 is preferably made from a self-lubricating material with relatively high load-carrying and wear resistant characteristics.

Figure 2:
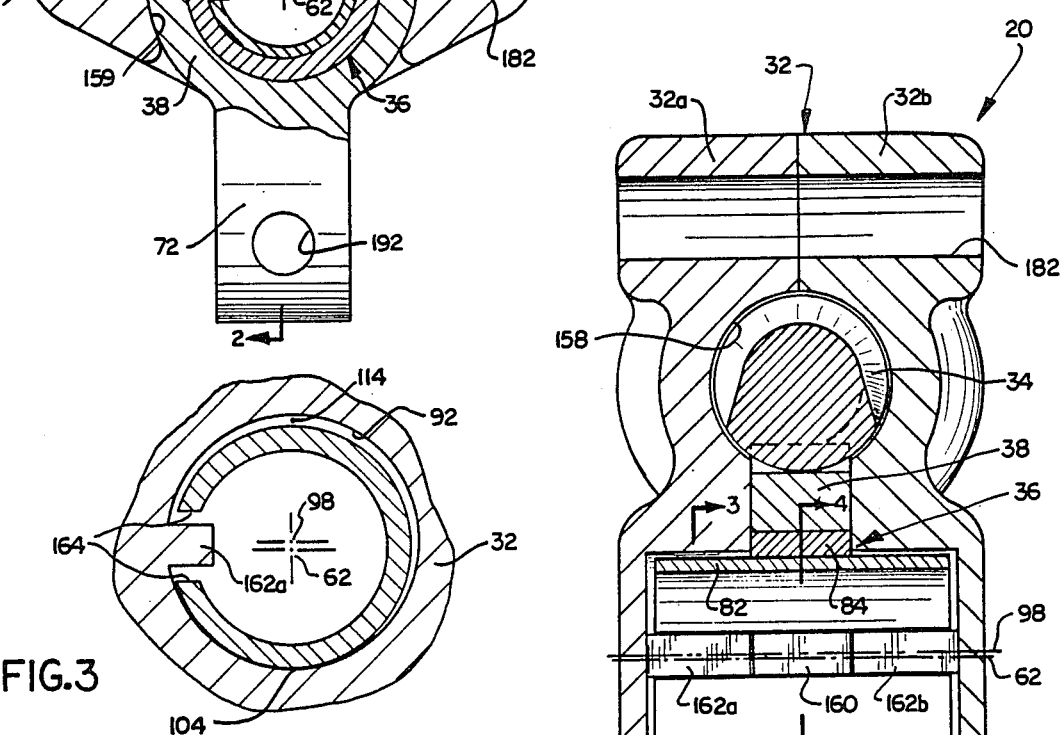
FIG. 2 is an enlarged cross sectional view, taken along the line 2—2 of FIG. 1.
Figure 4:
FIG. 4 is a cross sectional view, taken along the line 4—4 of FIG. 2.

The axis 62 coincides with the axis of the bore 96 of the bushing 84. The axis 62 is spaced vertically, as illustrated, from the axis 98 of the bores 92a, 92b. The spaced relationship of the axes 62 and 98 is best seen in FIGS. 2 and 4. The bore 96 of the bushing 84 and the bores 92a, 92b have approximately equal diameters. The bore 96 of the bushing 84 is thus downwardly offset from the bores 92a, 92b, as shown in FIG. 5.

The spring pin 82 is circumferentially compressed. A central portion of the spring pin 82 engages the bushing bore 96 only in a first region 102, which is located above the axis 62. Opposite ends of the spring pin 82 contact the housing surfaces defining the bores 92a, 92b only in regions 104 and 106. Regions 104, 106 are located below the axis 62. The regions 102, 104, 106 of contact are initially line contact.

A clearance space 112 is provided diametrically opposite from region 102 between the spring pin 82 and the bushing 84. The clearance space 112 allows the spring pin 82 to expand in the bushing 84. Clearance spaces 114 and 116 are also provided between the spring pin 82 and the surface defining the bores 92a, 92b. The clearance spaces 114, 116 are diametrically opposite from regions 104, 106, respectively. The clearance spaces 114, 116 allow the spring pin 82 to expand in the bores 92a, 92b.

The spring pin 82 transmits forces, as illustrated in FIG. 7, between the housing 32 and bushing 84. Biasing forces 122 are transmitted to the bushing 84 which urge the sector gear 38 vertically, as illustrated, into meshing engagement with the first gear 34. As the gear 38 moves vertically, the biasing forces 122 are distributed from line contact, as illustrated, over an increasing area 124. Support forces 132, 134 are transmitted to the housing 32 at areas 136, 138. As the spring pin expands the areas 136, 138 will also gradually increase.

As the teeth of the gears 34, 38 wear, the spring pin 82 expands and reduces the offset between the axes 62 and 98. The spring pin forces gear 38 into tight meshing engagement with the gear 34. The clearances 112, 114, 116 enable the sector gear 38 to move upwardly and allow the spring pin 82 to expand. The spring pin 82 expands until it is limited by the diameters of the bores 92a, 92b and bore 96. The offset between the bushing bore 96 and bores 92a, 92b will then no longer exist.

To assemble the steering gear 20, a bushing 152 (FIG. 1) is placed around the free end of the first gear 34, and a bearing 154 is placed onto the end of input shaft 42 of the first gear 34. The first gear 34, with the bushing 152 and bearing 154 installed, is placed into an opening 158 in housing half 32a along with a lock nut 184.

The sector gear 38 is placed in opening 159 so that the teeth 56 meshingly engage with teeth 54 formed in the first gear 34. The bushing 84 is inserted into the opening in the sector gear 38. The bushing 84 is rotated until a key 160 on its inner diameter aligns with the housing key 162a as illustrated in FIGS. 2 and 5.

Figure 3:
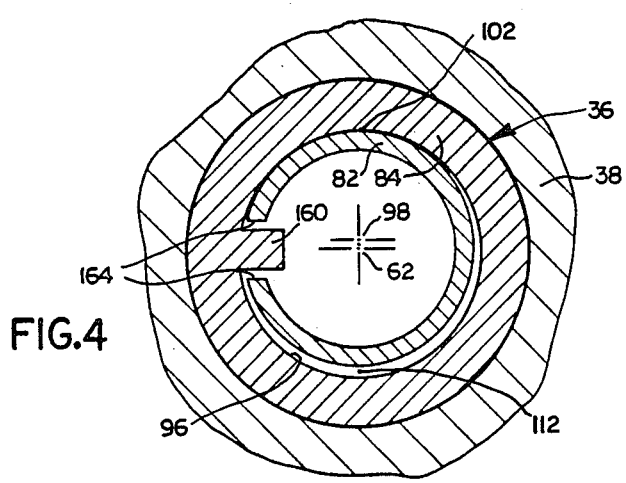
FIG. 3 is a cross sectional view, taken along the line 3—3 of FIG. 2.

The spring pin 82 is compressed, either manually or by a suitable tool, so that it will fit into bushing bore 96 and the bore 92a. The spring pin 82 is aligned so that the longitudinal slot defined by the ends 164 (FIGS. 3 and 4) of the spring pin will clear the keys 160, 162a as the spring pin is inserted into the bushing bore 96 and bore 92a. The keys 160, 162 serve two purposes. One purpose is to prevent the spring pin 82 from being overstressed by compression during installation and use. The second purpose is to prevent the bushing 84 from rotating relative to the spring pin 82 and housing 32.

The second housing half 32b is then placed over the gears 34, 38. The bore 92b fits over the free end of the spring pin 82. The housing halves 32a, 32b are brought into abutting engagement as illustrated in FIG. 2.

A seal 174 is placed between the input shaft 42 and housing 32. A dust cover 176 is placed around the input shaft 42 and the housing 32. A screw 180 is threaded into the lock nut 184 and engage the first gear 34 to preload the bearing 154 and to resist axial movement of the first gear. Retainers 172 (FIG. 1), made of an elastic material, are placed around portions of the housing 32 which surround the first gear 34. These retainers 172 hold the steering gear mechanism 20 together during shipping and handling.

Fasteners (not shown) are typically inserted through openings 182 to connect the steering gear to the vehicle, as is known. The fasteners will not only connect the steering gear with the vehicle but also firmly hold the housing halves 32a, 32b in abutting engagement.

In summary, a steering gear mechanism 20, is provided which has structure 36 for compensating for wear of meshing gear teeth 54, 56. The structure 36 for compensating for gear teeth 54, 56 is a spring which urges one gear 38 into meshing engagement with another gear 34 and which also functions as the shaft for the one gear 38. The structure 36 comprises a spring pin 82 and bushing 84. The spring pin 82 functions as the shaft for the one gear 38 and is circumferentially expandable to maintain the gear teeth 54, 56 in meshing engagement upon wear of the teeth.

Having described a preferred embodiment, we claim:

1. An apparatus comprising:

a housing;

first and second gears having teeth in meshing engagement;

means for supporting said first gear for rotation relative to said housing;

a circumferentially expandable spring pin supporting said second gear for rotational movement about an axis and biasing said second gear into meshing engagement with said first gear to take up wear of said teeth, said housing having means for supporting said spring pin;

said second gear having an opening through which said spring pin extends and said spring pin having a first surface area for transmitting force biasing said second gear into meshing engagement with said first gear and a second surface area opposite from said first surface area and at least partially defining a first clearance space between said spring pin and said second gear to accommodate movement of said second gear toward said first gear during the taking up of wear of said teeth; and said spring pin having third and fourth surface areas disposed on axially opposite sides of said second surface area and disposed in abutting engagement with surfaces of said housing, said spring pin having fifth and sixth surface areas disposed on axially opposite sides of said first surface area and at least partially defining second and third clearances between said spring pin and said housing to permit circumferential expansion of said spring pin.

2. An apparatus comprising:

a housing;

first and second gears having teeth in meshing engagement and located in said housing;

a circumferentially expandable spring pin supporting said second gear for rotational movement about an axis and biasing said second gear into meshing engagement with said first gear to take up wear of said teeth, said housing having means for supporting said spring pin;

bushing means disposed between said second gear and said spring pin for supporting said second gear for rotation relative to said spring pin; and means for blocking rotation of said spring pin and said bushing means relative to said housing during rotation of said second gear about its axis so that said second gear rotates relative to said spring pin and bushing means.

3. A steering gear comprising:

a housing;

a worm gear having an input portion;

means for rotatably supporting said worm gear in said housing, a sector gear having a plurality of teeth disposed in meshing engagement with teeth formed on said worm gear, said sector gear having an output portion;

a circumferentially expandable spring pin supporting said sector gear for pivotal movement relative to said housing and biasing said sector gear into meshing engagement with said worm gear to compensate for wear of said gears;

said housing having means supporting said spring pin;

said sector gear having an opening through which said spring pin extends and said spring pin having a first surface area for transmitting forces biasing said sector gear into meshing engagement with said worm gear and a second surface area opposite from said first surface area and at least partially defining a first clearance space between said spring pin and said sector gear to accommodate expansion of said spring pin to bias said sector gear into meshing engagement with said worm gear during the taking up of wear of said teeth; and said spring pin having third and fourth surface areas disposed on axially opposite sides of said second surface area and disposed in abutting engagement with said means supporting said spring pin, said spring pin having fifth and sixth surface areas disposed on axially opposite sides of said first surface area and at least partially defining second and third clearances between said spring pin and said means supporting said spring pin to permit circumferential expansion of said spring pin.

4. An apparatus as set forth in claim 3 further including bushing means disposed between said sector gear and said spring pin for supporting said sector gear for rotation relative to said spring pin.

5. A steering gear comprising:

a housing;

a worm gear having an input portion;

means for rotatably supporting said worm gear in said housing;

a sector gear having a plurality of teeth disposed in meshing engagement with teeth formed on said worm gear, said sector gear having an output portion;

a circumferentially expandable spring pin supporting said sector gear for pivotal movement relative to said housing and biasing said sector gear into meshing engagement with said worm gear to compensate for wear of said gears, said housing having means supporting said spring pin;

bushing means disposed between said sector gear and said spring pin for supporting said sector gear for rotation relative to said spring pin; and means for blocking rotation of said spring pin and said bushing means relative to said housing during pivoting of said sector gear about its axis so that said sector gear pivots relative to said spring pin and bushing means.

* * * * *